(12) United States Patent
Vayanos et al.

(10) Patent No.: US 6,707,420 B2
(45) Date of Patent: Mar. 16, 2004

(54) METHOD AND APPARATUS FOR DETERMINING LOCATION USING A COARSE POSITION ESTIMATE

(75) Inventors: Alkinoos Vayanos, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/135,799

(22) Filed: Apr. 29, 2002

(65) Prior Publication Data

US 2002/0149516 A1 Oct. 17, 2002

Related U.S. Application Data

(63) Continuation of application No. 09/773,207, filed on Jan. 30, 2001, now Pat. No. 6,429,809.

(51) Int. Cl.[7] .............................................. H04B 7/185
(52) U.S. Cl. ............................... 342/357.06; 342/357.02
(58) Field of Search ....................... 342/357.01, 357.02, 342/357.06; 701/213, 215

(56) References Cited

U.S. PATENT DOCUMENTS

| | | | | | |
|---|---|---|---|---|---|
| 6,275,185 | B1 | * | 8/2001 | Loomis | 342/357.14 |
| 6,304,210 | B1 | * | 10/2001 | Allison et al. | 342/357.08 |
| 6,420,999 | B1 | * | 7/2002 | Vayanos | 342/357.03 |
| 2002/0186165 | A1 | * | 12/2002 | Eschenbach | 342/357.15 |

* cited by examiner

*Primary Examiner*—Dao Phan
(74) *Attorney, Agent, or Firm*—Philip Wadsworth; Charles Brown; Bruce Greenhaus

(57) ABSTRACT

Corrections to a coarse position estimate of the pseudorange receiving device are made based upon knowledge of the amount of error present in inaccurate information (e.g., the old Almanac and/or Ephemeris) used to estimate the coarse position.

6 Claims, 3 Drawing Sheets

METHOD AND APPARATUS FOR DETERMINING LOCATION USING A COARSE POSITION ESTIMATE

RELATED APPLICATIONS

This Application is a continuation of U.S. patent application Ser. No. 09/773,207, filed on Jan. 30, 2001, now U.S. Pat. No. 6,429,809.

BACKGROUND OF THE INVENTION

1. Field of the Invention

The current invention relates to location of a device. More particularly, the present invention relates to a method and apparatus for determining the location of a device using a coarse estimate of the position of the device and estimates of the location of transmitters used to determine that coarse estimate.

2. Description of the Related Art

A common means by which to locate a device is to determine the amount of time required for signals transmitted from multiple sources at known locations to reach a receiver within the device to be located. One system that provides signals from a plurality of transmitters of known location is the well-known Global Positioning Satellite (GPS) system. The position of the satellites within the GPS system can be identified by a number of different pieces of information, some more accurate than others. For example, a reasonably accurate determination of the location of a GPS satellite can be made if the time of day at which a set of information, known as the "Ephemeris", is available. Transmissions from each satellite provide the time of day and the Ephemeris for the particular transmitting satellite. The Ephemeris provides information defining the orbits of the particular satellites from which the Ephemeris was received.

In addition, all of the satellites transmit another set of information, referred to as "Almanac". The Almanac includes less accurate information regarding the location of all of the satellites in the "constellation". Both the Almanac and the Ephemeris information is valid for a limited amount of time. The Almanac information is considered to be accurate to approximately 3 kilometers for approximately one week from the time the Almanac is transmitted. The Ephemeris provides information regarding the satellite orbits with an accuracy of approximately 1 meter for a period of time equal to approximately 2 hours. The errors in both the Almanac information and the Ephemeris information grow as the data ages. Accordingly, information regarding the location of the satellites is less and less accurate as the Almanac and Ephemeris age, unless updated information is received at appropriate intervals in time.

Without accurate information regarding the location of the satellites, the location that is determined based on the receipt of signals transmitted from the satellites will be inaccurate. Therefore, it is necessary to receive updates from the satellite or alternatively from an alternative source. One such alternative source is a wireless communication system base station that has a GPS receiver capable of attaining the required information from the GPS satellites. However, for the device to be located to attain the information at regular intervals consumes valuable resources, such as power required to receive the information, and bandwidth required to transmit the information from a remote source to the device. Accordingly, there is currently a need for a means by which accurate determinations of the position of a receiver can be made with a minimal expenditure of resources. This need is particularly acute when using systems in which transmitters move over time and the location of such transmitters is known accurately only upon receiving updates from a source remote to the device performing the location calculation. The method and apparatus disclosed herein satisfies this need.

SUMMARY OF THE INVENTION

The presently disclosed method and apparatus allows the location of a pseudorange receiving device (i.e., a coarse position estimate) to be calculated using less accurate information. In one instance, the less accurate information is outdated Almanac or Ephemeris. As noted above, Almanac and Ephemeris information provide the location of position location transmitters, such as GPS satellites. The use of inaccurate locations for transmitters causes errors in the determination of the location of the pseudorange receiving device.

In accordance with the presently disclosed method and apparatus, corrections to the coarse position estimate of the pseudorange receiving device are made at a remote location at which more accurate information is available. Alternatively, such corrections can be made at a remote time when more accurate information is available. The disclosed method and apparatus relies on knowledge of the errors present in the less accurate information (e.g., the old Almanac and/or Ephemeris) that was used to calculate the coarse position estimate.

One advantage of the disclosed method and apparatus is that a coarse position location estimate and sufficient identification of the information used to calculate the coarse position estimate can be conveyed or stored in relatively short messages. In contrast, it requires greater bandwidth to transmit to a location that has more accurate information, the measurements needed to calculate a more accurate estimate of the location. Similarly, it requires greater storage capacity to store the measurements until more accurate information is available. Accordingly, the present invention provides a method and apparatus for saving either memory or bandwidth in calculating position estimates when accurate information is not available at the time or place where the measurements were taken.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
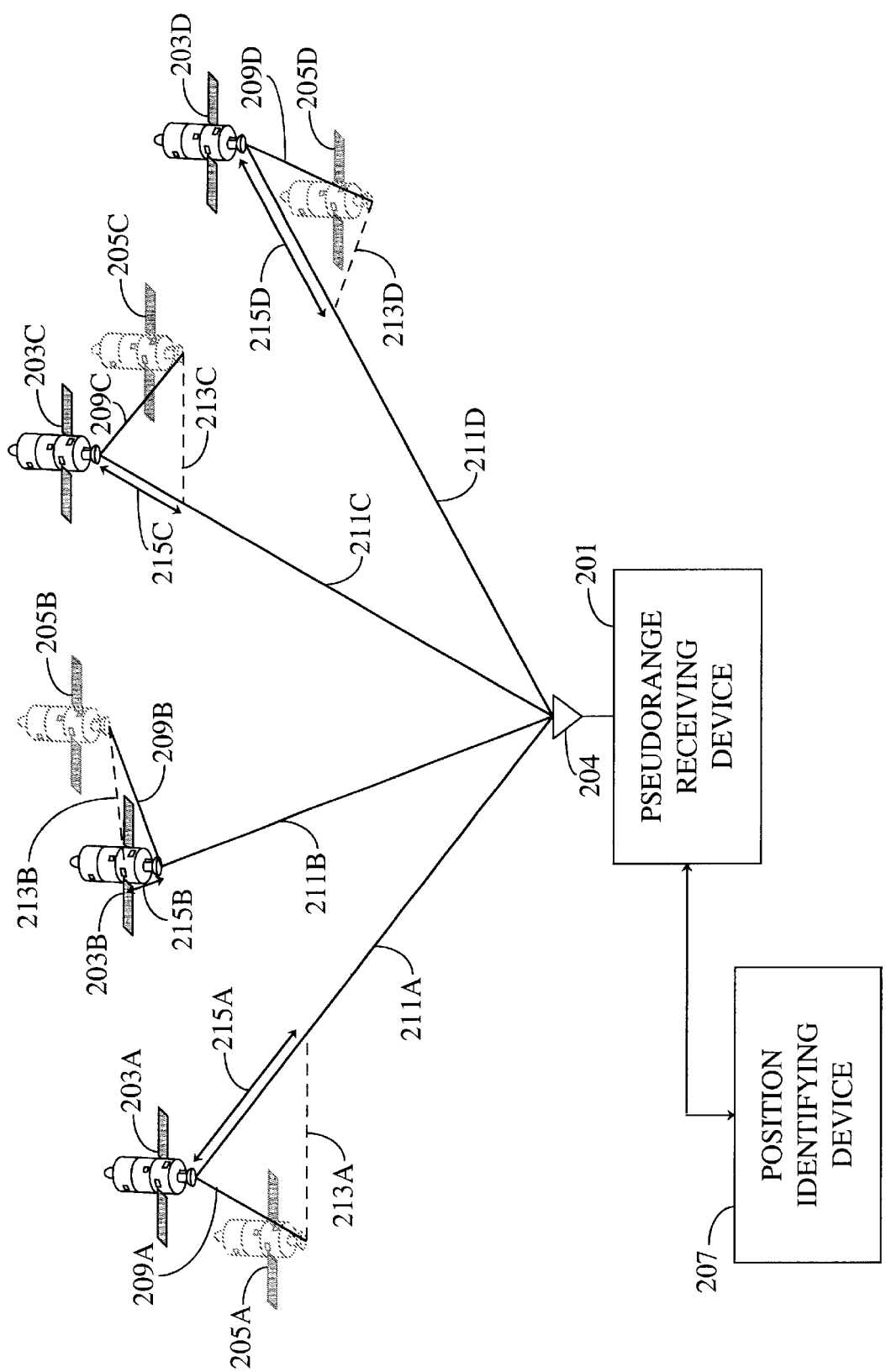
FIG. 1 is a simplified illustration of a system including a presently disclosed pseudorange receiving device.

FIG. 1 is a simplified illustration of a system including a presently disclosed pseudorange receiving device 201. The pseudorange receiving device 201 receives signals transmitted by a plurality of transmitters 203a–203d (referenced collectively using reference number "203") through an antenna 204. The pseudorange receiving device 201 communicates with a position identifying device 207. The position identifying device 207 assists in determining the position of the pseudo receiving device 201, as will be explained in more detail below.

In one embodiment of the present invention, the pseudorange receiving device 201 is a cellular telephone capable of receiving signals from the plurality of transmitters 203. However, it should be understood that the pseudorange receiving device 201 may be any device capable of determining the arrival times of received signals with respect to a reference time. For example, the pseudorange receiving device 201 may be a computer terminal having a wireless modem, a stand-alone GPS receiver, a receiver capable of receiving signals from ground based transmitters, or any other such receiver. It should also be noted that coarse position estimates made using inaccurate transmitter locations together with actual ranges, as opposed to pseudoranges, may be corrected using the disclosed method and apparatus.

The difference between a reference time and the time that the signal is received is commonly known as the "pseudorange". The reference time may be any time, as long as the reference time is common to all pseudo-range measurements being made (or the pseudo-range measurements can be adjusted to compensate for differences in the reference times used). The term pseudorange is used to indicate that the exact amount of time between transmission and reception cannot be determined, typically due to offsets in the clocks used in the transmitter and the receiver.

In addition to the actual position of each transmitter 203, FIG. 1 illustrates an estimated position for each transmitter 205a–205d (referenced collectively using reference number "205"). In the instance in which the transmitters are satellites, such as GPS satellites, the position of the satellites can be identified by a number of different pieces of information, some more accurate than others. For example, a reasonably accurate determination of the location of a GPS satellite can be made if the time of day and information, known as the "Ephemeris" is available. However, the Almanac information is valid for a limited amount of time. A less accurate determination can be made if accurate time of day and current "Almanac" information is available. However, both Almanac and Ephemeris information are valid for a limited time.

The presently disclosed method and apparatus provides a means by which the location of a pseudorange receiving device 201 (i.e., a coarse position estimate) can be calculated using less accurate information regarding the location of satellites (such as an old Almanac or old Ephemeris). Since pseudoranges and the inaccurate locations of each transmitter are used to determine the coarse position estimate of the pseudorange receiving device 201, the errors in the locations of the transmitters 203 will translate into errors in calculating the position of the pseudorange receiving device 201.

Corrections to the coarse position estimate of the pseudorange receiving device 201 are then made based upon knowledge of the amount of error present in the less accurate information (e.g., the old Almanac and/or Ephemeris) that was used to calculate the coarse position estimate.

In one embodiment of the presently disclosed method and apparatus, the corrections are made at the position identifying device 207. The position identifying device 207 may be remotely located with respect to the pseudorange receiving device 201. However, the position identifying device 207 may be co-located with the pseudorange receiving device 201 in some embodiments of the disclosed method and apparatus.

Figure 2:
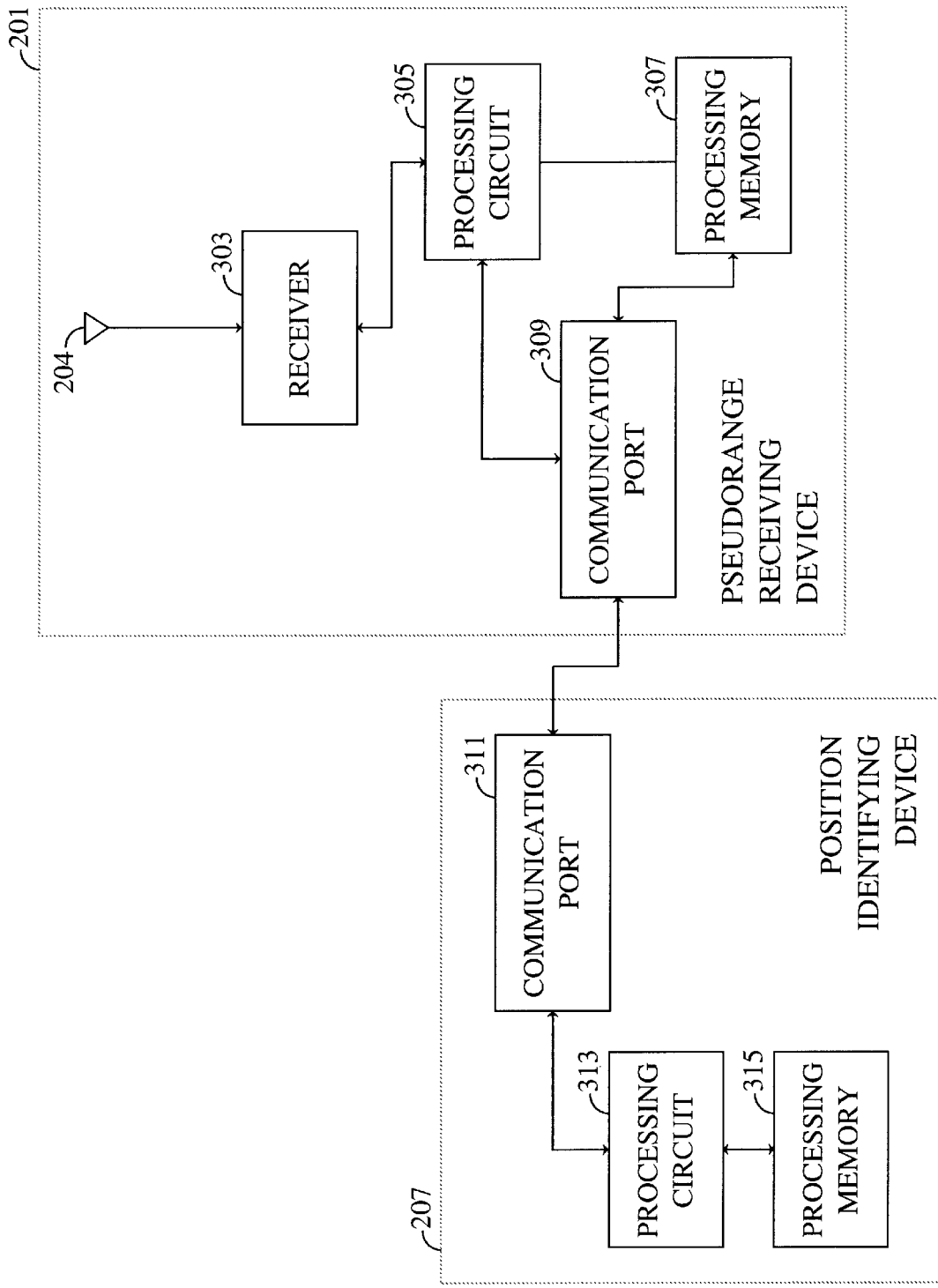
FIG. 2 is a simplified block diagram of a pseudorange receiving device and a position identifying device in accordance with the disclosed method and apparatus.

FIG. 2 is a simplified block diagram of a pseudorange receiving device 201 and a position identifying device 207 in accordance with the disclosed method and apparatus. The pseudorange receiving device 201 may be a component of a wireless communication system terminal, such as a wireless telephone or a computer using a wireless modem. Alternatively, the pseudorange receiving device 201 may be a stand-alone position location determining unit, such as a stand-alone GPS receiver. The position identifying device 207 may be a component (such as "Position Determining Equipment" commonly referred to as a "PDE") of a wireless communication system base station transceiver subsystem (BTS), base station controller (BSC), or mobile switching controller (MSC) of a wireless communication system. Alternatively, the position identifying device 207 may be a component of, and co-located with, the wireless communication system terminal or other device that includes the pseudorange receiving device 201. One example of a system in which the position identifying device 207 and the pseudorange receiving device are co-located is a system in which accurate information about the location of the transmitters 203 is not currently available when the measurements are made. However, accurate information will become available at some time in the future. Accordingly, a coarse position estimate is calculated immediately upon making the pseudorange measurement (or actual range measurements). The coarse position estimate is then stored until more accurate information regarding the location of the transmitters 203 becomes available.

The pseudorange receiving device 201 is coupled to an antenna 204, and includes a receiver 303, a processing circuit 305, a processing memory 307 and a communications port 309. The antenna 204 receives signals from the transmitters 203 (shown in FIG. 1). The received signals are coupled from the antenna 204 to the receiver 303. The receiver 303 includes all of the radio frequency circuitry (or other such receiving circuitry if the signals are not radio frequency signals) necessary to determine the intelligence in the received signals. The intelligence is then coupled to the processing circuit 305. The processing circuit 305 calculates positions. Such calculations may include calculations intended to provide pseudoranges to the position identifying device 207. Alternatively, or in addition to the pseudoranges, position calculations may include coarse position estimations that indicate the position of the pseudorange receiving device 201. Such coarse position estimates have a relatively large error due to the large errors in the assumed positions of the transmitters 203.

In accordance with one embodiment of the disclosed method and apparatus, the processing circuit 305 calculates position by executing program instructions stored within the processing memory 307. However, it will be understood by those skilled in the art that the processing circuit 305 of the disclosed method and apparatus may include the processing memory required to store the program instructions, or that the processing circuit 305 may be a state machine or dedicated circuitry that does not require program instructions to calculate the position.

The results of the position determination calculations are coupled to the communication port 309 within the pseudorange receiving device 201. The communication port 309 is merely a communication interface that couples the results of the position determination calculations to a communication port 311 within the position identifying device 207. Similarly, the communication port 311 is a communication interface between the communication port 309 and the position identifying device 207.

In addition to the communication port 311, the position identifying device 207 also includes a processing circuit 313 and a processing memory 315. However, it should be noted that the processing circuit 305 may be capable of directly communicating with the position identifying device 207 without the need for a discrete communication port. This may be the case in instances in which the position identifying device 207 and the pseudorange receiving device 201 are co-located. However, it should be understood that this may also be the case in embodiments of the disclosed method and apparatus in which the position identifying device 207 and the pseudorange receiving device 201 are not co-located.

The communication port 311 within the position identifying device 207 is coupled to the processing circuit 313. As is the case with the pseudorange receiving device 201, the processing circuit 313 of the position identifying device 207 may be capable of communicating directly with the pseudorange receiving device 201, making the communication port 311 of the position identifying device 207 unnecessary.

The processing circuit 313 receives the results of the position determination calculations performed within the pseudorange receiving device 201. In addition, processing circuit 313 within the position identifying device 207 receives a copy of the information that was used by the pseudorange receiving device 201 to perform the position determination calculations. It will be understood by those skilled in the art that the information used by the pseudorange receiving device 201 may be the Almanac (and the time at which the Almanac was valid), the Ephemeris (and the time at which the Ephemeris was valid), or any other information that the processing circuit 305 within the pseudorange receiving device 201 could use to estimate the location of the transmitters 203 (shown in FIG. 1). This information may be provided by the pseudorange receiving device 201 together with the results of the position determination calculations. It should also be understood that in some embodiments, it may not be necessary to make explicit what information was used, since other indicators may be used to deduce what information was used. For example, the time at which coarse position estimates are transmitted to a position identifying device 207 may be sufficient to allow the position identifying device 207 to correctly deduce what Almanac or Ephemeris was used to calculate the coarse position estimate. Furthermore, in some embodiments of the disclosed method and apparatus, the position identifying device 207 may be responsible for transmitting to the pseudorange receiving device 201 the information used by the pseudorange receiving device 201 to calculate the coarse position estimate. Therefore, there would be no need for the pseudorange receiving device to tell the position identifying device 207 what information was used.

In one embodiment of the disclosed method and apparatus, the position identifying device 207 receives this information prior to receipt of the results of the position determination calculations. Furthermore, the information used by the processing circuit 305 may be received within the position identifying device 207 from a source other than the pseudorange receiving device 201 over a communication link that is not shown for the sake of simplicity. For example, the information may be received directly by the position identifying device 207 from the transmitters 203. Alternatively, the information may be received by the position identifying device 207 from a source that is distinct from any of the components shown in FIG. 1, such as a component (not shown) of a wireless communication system base station.

In one embodiment of the disclosed method and apparatus, the position identifying device 207 may have more than one set of information (i.e., several versions of the Almanac, any one of which the pseudorange receiving device 201 may have used to perform the position determination calculation). In this case, the pseudorange receiving device 201 may need to provide additional information to the position identifying device 207. Such additional information would indicate what information, from among the information available to the position identifying device 207, was used by the pseudorange receiving device 201 to perform the position determination calculation.

Figure 3:
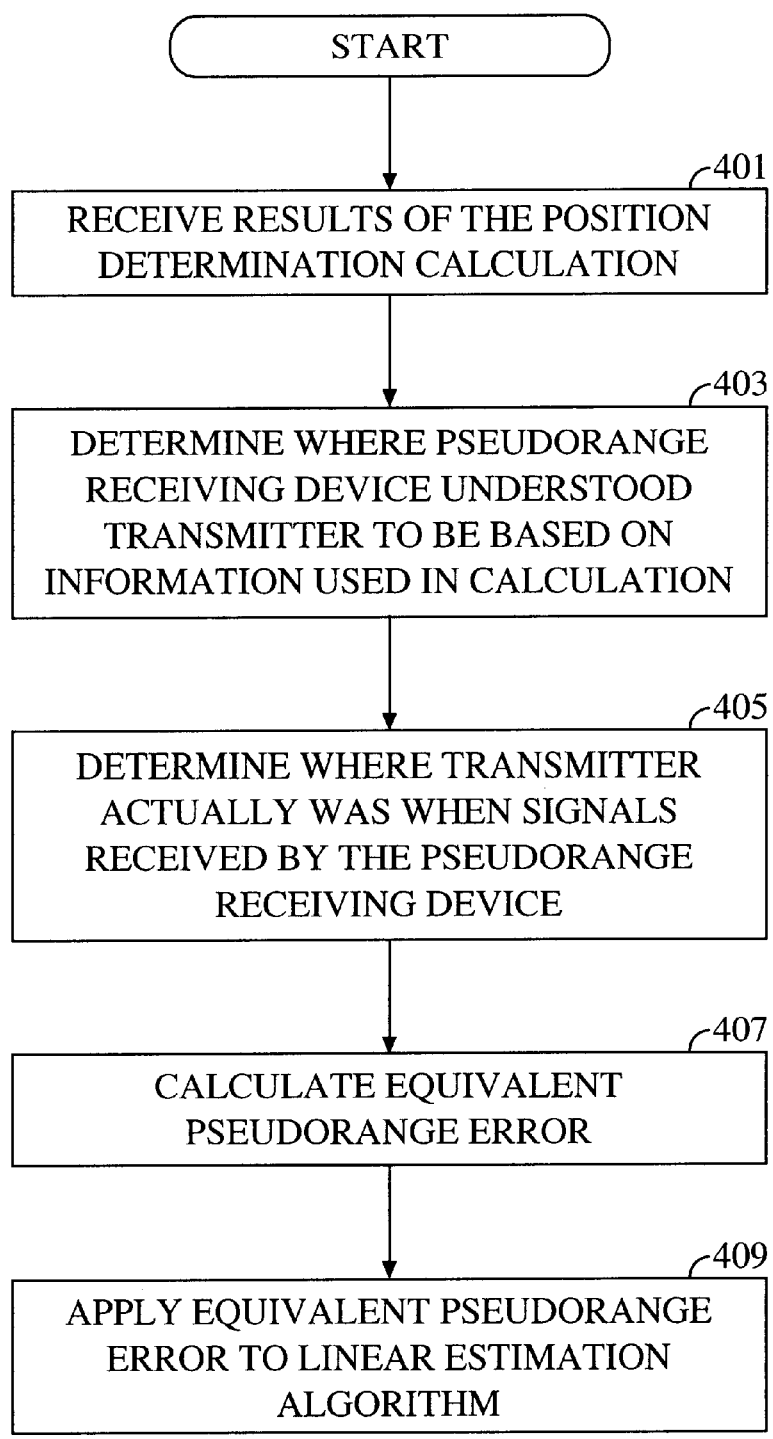
FIG. 3 is a flowchart illustrating the process by which the position identifying device determines a more accurate position estimate (i.e., location of the pseudorange receiving device) based on a coarse position estimate calculated within the pseudorange receiving device.

FIG. 3 is a flowchart illustrating the process by which the position identifying device 207 determines a more accurate position estimate (i.e., location of the pseudorange receiving device 201) based on a coarse position estimate calculated within the pseudorange receiving device.

As noted above, the position identifying device 207 first receives from the pseudorange receiving device 201, the results of the position determination calculation (such as a coarse position estimate) (STEP 401). The position identifying device 207 also receives information that indicates what data was used to perform the position determination calculation (e.g., what version of the Almanac or Ephemeris was used to determine a coarse position estimate) and the time at which the pseudorange measurements were taken (STEP 403). Next, the position identifying device 207 determines a more accurate estimate of the location of the transmitters 203 (STEP 405). This determination may be made by using the Almanac and Ephemeris information that is most accurate for the time at which the pseudorange measurements were made by the pseudorange receiving device 201. In one embodiment, the position identifying device 207 maintains a log of Almanac and Ephemeris transmitted by the satellites of the GPS constellation. Such a log allows the position identifying device 207 to use the most accurate Almanac and Ephemeris to correct the position determination calculation received from the pseudorange receiving device 201 in the manner described below.

Once the position identifying device 207 has relatively accurate information regarding the position of the transmitters 203 and information regarding the position 205 (see FIG. 1) where the pseudorange receiving device 201 assumed the transmitters to be, the position identifying device 207 can attempt to correct the position determination calculation received from the pseudorange receiving device 201.

Correction to the position determination calculation is made by first calculating an "equivalent pseudorange error". An equivalent pseudorange error is calculated for each transmitter 203. FIG. 1 shows a transmitter at a point that represents the "more accurate" estimate of the location of the transmitter 203. FIG. 1 also shows transmitter at points 205a–205d (referenced collectively by the reference number "205") that represent a less accurate estimate of the location used by the pseudorange receiving device 201 to perform the position determination calculations. It should be noted the transmitter 203a and the transmitter 205a correspond to position location estimates for the same satellites (as illustrated by the fact that the transmitter at location 205a is shown in shadow). However, the location of the transmitter is perceived to be different depending upon whether the location of the transmitter has been calculated using more or less current information (i.e., using Almanac and Ephemeris that is, or is not, accurate for the time at which the pseudorange measurement was taken).

The position identifying device 207 identifies a "transmitter position error vector" 209a–209d (referenced collectively by the reference number "209") associated with each transmitter 203, the vector being formed between the two points 203, 205. The transmitter position error vector associated with each transmitter 203 is then projected onto a unit vector in the direction of the line 211a–211d (referenced collectively by the reference number "211") between the transmitter 203 and the pseudorange receiving device 201. This projection is represented in FIG. 1 by a dashed line 213 between the point 205 and a point on the line 211, the point on the line 211 being selected such that the line 213 is perpendicular to the line 211.

It will be understood by those skilled in the art that the projection has a magnitude represented by the two headed arrows 215a–215d (referenced collectively as reference number "215") shown in FIG. 1. This magnitude represents the value of the equivalent pseudorange error. This magnitude has either a positive or negative value depending upon the sign convention that is selected.

Due to the relatively large distance between the transmitters 203 and the pseudorange receiving device 201 and the position identifying device 207, the direction of the unit vector could alternatively be defined by the line between the point 205 and the position identifying device 207. The direction of the unit vector could also be defined by the line between the point 205 and the pseudorange receiving device 201. Still further, the direction of the unit vector could be defined by the line between the point 203 and the position identifying device 207. Still further, the direction of the unit vector could be defined by the line between either the point 203 or 205 and a wireless communication system base station with which the pseudorange receiving device is in communication. All of these directions will be essentially identical, even though that does not appear to be the case in FIG. 1 because of the distortion in the relative distances between the elements shown. That is, the distance between the transmitters and the devices 201, 207 is much greater than the distance between the points 203 and 205. Furthermore, the distance between the transmitters and either of the devices 201, 207 is much greater than the distance between the devices 201 and 207.

Once the value of the equivalent pseudorange error is calculated for each of the transmitters, that value is applied to a linear estimation algorithm, such as the well-known "Least Mean Squares" algorithm that is commonly used to determine the location of a GPS receiver from pseudorange values to the GPS satellites (STEP 409).

The following is a more detailed description of the process used to calculate the location of the pseudorange receiving device 201 based upon: (1) knowledge of the inaccurate estimates of the location of the transmitters, such as GPS satellites in one example, used to calculate an erroneous location for the pseudorange receiving device 201; (2) the time at which the pseudorange measurements were taken; and (3) a more accurate knowledge of the location of the GPS satellites at the time the pseudorange measurements were taken.

It should be understood that there is an assumption that only the radial components of the transmitter location errors need to be taken into account. The purpose of the presently disclosed method and apparatus is to attain an offset in the position of the pseudorange receiving device 201 and add that offset to the position determination calculation provided to the position identifying device 207 by the pseudorange receiving device. For this example, the assumption is that the transmitters are GPS satellites. However, it will be clear to those skilled in the art that this process could be used with any mobile transmitter for which location information is available which ages.

$$\bar{s}_i^a = \lfloor x_{Si}^a \ y_{Si}^a \ z_{Si}^a \rfloor$$

is the almanac-derived location and $b_{Si}^a$ is the clock bias.

$$\bar{s}_i^e = \lfloor x_{Si}^e \ y_{Si}^e \ z_{Si}^e \rfloor$$

is the ephemeris-derived location and and $b_{Si}^e$ is clock bias for the $i^{th}$ satellite at the time the pseudo-range measurements were made.

$$\bar{u}^a = \lfloor x_u^a \ y_u^a \ z_u^a \ b_u^a \rfloor$$

is the location of the pseudorange receiving device 201 obtained by the pseudorange receiving device 201 when running a Least Mean Square (LMS) algorithm with pseudorange measurements made on the signals received from the satellites and satellite locations obtained from the almanac.

$$\bar{u}^{init} = \lfloor x_u^{init} \ y_u^{init} \ z_u^{init} \rfloor$$

is an initial estimate of the user location. For this initial estimate, the location $\bar{u}^a$ can be used. However, those skilled in the art will understand that this estimate can be derived from other sources, such as the ranging measurements performed over a land communication network.

The measurement error due to the difference between the location of the satellite i as determined based on the Almanac and the location of the satellite i as determined based on the Ephemeris is given by:

$$\varepsilon_i = (\bar{s}_i^e - \bar{s}_i^a) \cdot \frac{\bar{s}_i^a - \bar{u}^{init}}{|\bar{s}_i^a - \bar{u}^{init}|} + (b_{S1}^e - b_{S1}^a) \cdot c$$

where c is defined as being the speed of light.
These errors can be combined into the column vector $\bar{\varepsilon}$.
The geometry matrix is:

$$H = \begin{bmatrix} \frac{x_u^{init} - x_{S1}^a}{|\bar{u}^{init} - \bar{s}_1^a|} & \frac{y_u^{init} - y_{S1}^a}{|\bar{u}^{init} - \bar{s}_1^a|} & \frac{z_u^{init} - z_{S1}^a}{|\bar{u}^{init} - \bar{s}_1^a|} & -1 \\ \frac{x_u^{init} - x_{S2}^a}{|\bar{u}^{init} - \bar{s}_2^a|} & \frac{y_u^{init} - y_{S2}^a}{|\bar{u}^{init} - \bar{s}_2^a|} & \frac{z_u^{init} - z_{S2}^a}{|\bar{u}^{init} - \bar{s}_2^a|} & -1 \\ \vdots & \vdots & \vdots & \vdots \\ \frac{x_u^{init} - x_{Sn}^a}{|\bar{u}^{init} - \bar{s}_n^a|} & \frac{y_u^{init} - y_{Sn}^a}{|\bar{u}^{init} - \bar{s}_n^a|} & \frac{z_u^{init} - z_{Sn}^a}{|\bar{u}^{init} - \bar{s}_n^a|} & -1 \end{bmatrix}$$

Based on the linearity assumption, the optimal estimate of the position error resulting from the satellite position errors is going to be:

$$\delta \hat{\bar{u}}^T = (H^T \cdot R^{-1} \cdot H)^{-1} \cdot H^T \cdot \bar{\varepsilon}$$

where R is the covariance matrix of the satellite measurements. The final estimate of the user position obtained using the ephemeris derived satellite position will therefore be:

$$\hat{\bar{u}}^e = \bar{u}^a + \delta\hat{\bar{u}}$$

Those skilled in the art will recognize that the validity of this calculation breaks down once the satellite position error becomes bigger than a few kilometers.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for calculating an accurate location of a pseudoranges receiving device, comprising:

a) calculating a coarse location of the pseudorange receiving device using inaccurate information regarding the location of transmitters; and b) providing from the pseudorange receiving device to a position identifying device the calculated inaccurate location of the pseudorange receiving device and an indication of the content of the inaccurate information regarding the location of the transmitters.

2. The method of claim 1, wherein the transmitters are GPS satellites and the inaccurate information is Almanac information regarding the location of the GPS satellites.

3. The method of claim 2, wherein the Almanac information is at least one week old.

4. The method of claim 1, wherein the transmitters are GPS satellites and the inaccurate information is Ephemeris information regarding the location of the GPS satellites.

5. The method of claim 4, wherein the Ephemeris information is at least 2 hours old.

6. The method of claim 1, wherein the pseudorange receiving device is co-located with the position identifying device.

* * * * *